United States Patent [19]

Mellott

[11] Patent Number: 4,463,786
[45] Date of Patent: Aug. 7, 1984

[54] TIMBER DAPPING APPARATUS

[76] Inventor: Hayes R. Mellott, 13156 Long La., Mercersburg, Pa. 17236

[21] Appl. No.: 394,880

[22] Filed: Jul. 2, 1982

[51] Int. Cl.$^3$ ............................................. B27C 5/00
[52] U.S. Cl. ............................... 144/133 A; 144/2 R; 144/136 R
[58] Field of Search ........... 144/133 R, 133 A, 133 B, 144/136 R; 408/237; 409/132, 210, 211, 212, 216, 218

[56] References Cited

U.S. PATENT DOCUMENTS

| | | | |
|---|---|---|---|
| 880,177 | 2/1908 | Thomas | 144/133 R |
| 901,681 | 10/1908 | Collet . | |
| 999,623 | 8/1911 | Altenstein | 144/133 R |
| 1,086,209 | 2/1914 | Dankl . | |
| 1,141,887 | 6/1915 | Purdy et al. . | |
| 1,159,795 | 11/1915 | Purdy et al. . | |
| 1,210,908 | 6/1917 | Collet . | |
| 1,704,273 | 3/1929 | Alinder et al. . | |
| 2,520,457 | 8/1950 | Cook | 144/133 R |
| 3,799,224 | 3/1974 | Vizziello et al. | 144/133 R |
| 4,071,060 | 1/1978 | Busch | 144/3 H |

OTHER PUBLICATIONS

Carter Laser Guide Line Light, Carter Products Company, Inc., Grand Rapids, Michigan 49503, May 1, 1979.

*Primary Examiner*—W. D. Bray
*Assistant Examiner*—Jorji M. Griffin
*Attorney, Agent, or Firm*—O'Neil & Bean

[57] ABSTRACT

Apparatus for cutting flat bottomed daps in heavy timber includes conveyor means for moving the timber through the apparatus and a cutter head operable to cut a relatively wide dap in one surface of the timber. The cutter head is supported for movement to adjust the depth of the dap and to adapt the apparatus to dap timber of various sizes. The cutter head is also supported for limited movement longitudinally of the timber along a track mounted for limited pivotal movement about an axis extending in spaced relation to and transversely of the timber whereby the angle of the bottom surface of the dap relative to the longitudinal axis of the timber can be varied. By moving the cutter head to a plurality of positions along its pivotal support track and moving the cutter head and timber relatively to one another to make a dap at each position with the daps either overlapping or being spaced from one another, the bottom surface of the respective daps will all lie in a common plane. A laser beam mounted on the cutter head support can project a line of high intensity light on the timber to clearly indicate the depth and angle of the cut to be made by the cutter head in any adjusted position.

24 Claims, 8 Drawing Figures

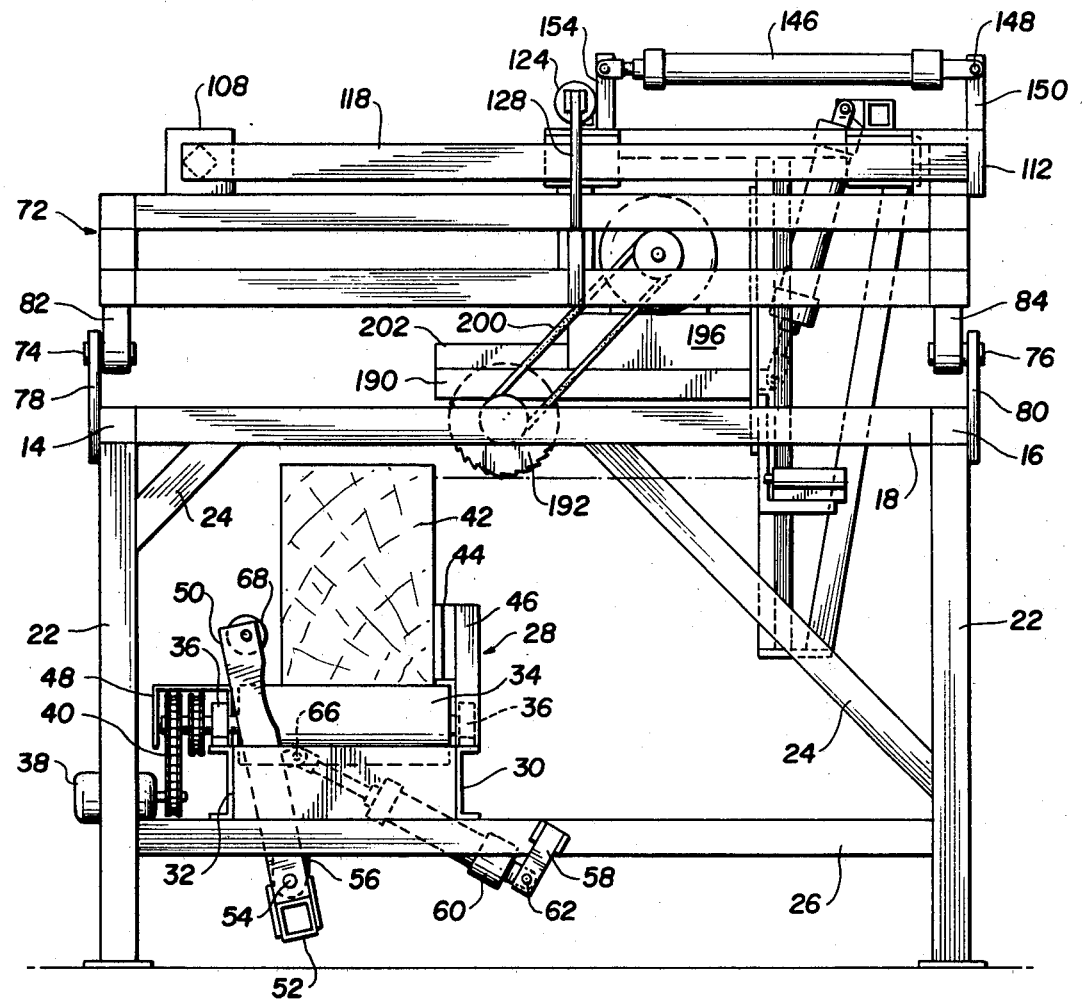

TIMBER DAPPING APPARATUS

BACKGROUND OF THE INVENTION

1. Field of the Invention

This invention relates to timber dapping apparatus, and more particularly to an improved timber dapping apparatus for cutting flat bottomed daps in heavy timber, with the flat bottom being disposed at a predetermined angle relative to the longitudinal axis of the timber.

2. Description of the Prior Art

It is frequently necessary to cut relatively wide, flat bottomed notches, commonly referred to as gains or daps, in heavy timber such as railroad ties, utility poles, bridge timber, and the like, and numerous devices and procedures have been developed in the past for cutting such notches. For example, numerous machines have been developed for adzing, milling or otherwise forming recessed surfaces in the top of railroad ties to act as seats for the rail plates employed to secure rails to the ties. Since the present invention is particularly well adapted for such use, it will be described herein as an apparatus for dapping or gaining railroad ties or crossties, it being understood that the invention is not so limited, and that the term crosstie should be interpreted to mean any heavy timber, beam or the like.

The prior art tie dapping apparatus generally has included means for feeding the ties transversely, i.e., in a direction perpendicular to their length, through a work station where two driven cutting heads engage the top surface to adz, mill, saw, or otherwise simultaneously form two daps. Frequently the dapping operation is followed, at a subsequent work station, by a boring operation where pilot holes are formed in a fixed pattern in the bottom surface of each dap for receiving and accurately locating rails spikes. One such apparatus is disclosed, for example, in U.S. Pat. No. 4,071,060 wherein ties are fed in intermittent steps through the apparatus by reciprocating feeding arms having a plurality of pivoted feed dogs mounted thereon. A pair of motor driven adzing heads are mounted at a first station for cutting a pair of transverse recesses in the upwardly directed surface of the crossties as they are moved therethrough. At a second station, motor driven boring tools are lowered to form pilot holes in the recessed surfaces. The adzing heads are adjustable vertically to control the depth of cut of the respective recesses.

U.S. Pat. No. 1,704,273 also discloses a machine for adzing and boring railroad ties in which the ties are advanced through the apparatus in a direction perpendicular to their longitudinal axis. Two separate feeding mechanisms are provided, one to advance the ties through an adzing station, and the other through a boring station. Each feeding mechanism includes a reciprocating dog arrangement for engaging each end of the tie, and clamping means is provided to firmly hold the tie during the adzing operation.

A hand controlled pole gaining apparatus is disclosed in U.S. Pat. No. 2,521,457 wherein utility poles are conveyed longitudinally past a driven gaining head. The pole is stopped at the desired position and the gaining head is manually lowered and reciprocated across the stationary pole to cut the gain.

U.S. Pat. No. 901,681 discloses a router type rotary cutting head for use in a tie gaining apparatus. Although details of the apparatus are not disclosed, the patent states that the vertical shaft of the cutting head may be inclined slightly relative to the vertical so as to adapt the gain to receive an inclined base or foot of a rail.

It is also known to cut a dap in a railroad tie with the recessed flat surface of the dap being disposed at an accute angle relative to the longitudinal axis of the beam by initially elevating one end of the tie to an angle relative to the horizontal corresponding to the desired angle of the recessed surface of the dap. The tie is clamped and held in this position and a cutting head is moved across the tie to cut the dap. When using this apparatus to cut a dap having a width, measured longitudinally of the tie, greater than that made by a single pass of the cutting head, it is necessary to make a first pass with the cutter head, then lower and move the tie longitudinally the desired distance, then again raise and clamp it at the desired angle. This procedure is not only very time consuming, but great difficulty is encountered in maintaining the flat bottom surface cut by two passes in exactly the same plane.

While the prior art gaining or dapping devices have met with some success and have been used for many years, they have not been entirely satisfactory for various reasons. For example, the machines adapted to simultaneously dap both ends of a tie generally have not been operable to cut the daps at different depths while forming the bottom surface of such daps in a common plane inclined relative to the longitudinal axis of the tie as required, for example, to bank a track in a curve. Further, such devices generally have not been readily adjustable to form daps of different widths while assuring that the bottom surface of a wide dap made by multiple passes of the cutter head will be completely flat.

It is, therefore, the primary object of the present invention to provide an improved timber dapping apparatus which overcomes the foregoing and other drawbacks of the prior art.

Another object of the present invention is to provide a timber dapping apparatus which may be employed to form daps of various widths without requiring changing of the cutting elements.

Another object of the invention is to provide a timber dapping apparatus in which a cutting head may be moved in a direction parallel to the longitudinal axis of a timber positioned in the apparatus and in which the cutting head may make multiple passes across the timber to form a dap having a width greater than the width of the cutting element.

Another object of the invention is to provide such an apparatus wherein the cutting head may be pivotted about an axis extending transversely of and spaced from the longitudinal axis of a timber in the apparatus whereby the bottom surface of a dap cut in the timber extends at an angle inclined relative to the longitudinal axis of the timber.

SUMMARY OF THE INVENTION

The foregoing and other objects and advantages are achieved in a tie dapping apparatus according to the present invention wherein a driven conveyor is provided to move ties one at a time through the apparatus past a dapping station at which a driven cutting head forms a dap in the top surface of the tie. The driven cutting head is supported for vertical movement to accommodate ties of various thicknesses and to enable the dap to be cut to the desired depth. The cutting head is also supported for limited movement longitudinally of a tie at the dapping station and for limited pivotal movement about an axis extending transversely of and spaced above the longitudinal axis of the tie to enable cutting a dap having a recessed surface disposed either parallel with or at an acute angle relative to such longitudinal axis, as desired. The cutting head is supported for relative movement transversely of the tie at the dapping station to cut a dap of predetermined width, depending upon the size of the cutting head used, in a single pass of the cutting head transversely of the tie. Daps of greater width may be formed by multiple passes of the cutter head, with the cutter head being moved longitudinally of the tie after each pass. Control means are provided for controlling movement of a tie through the apparatus and for adjusting the position of the cutter head relative to the tie. Preferably, laser means is provided on the cutter support in position to project a high intensity line of light on the vertical face of the tie to provide an indication to the operator of the location of the bottom surface of the dap to be cut.

BRIEF DESCRIPTION OF THE DRAWINGS

The foregoing and other objects and advantages of the invention will be apparent from the detailed description contained hereinbelow, taken in conjunction with the drawings, in which:

FIG. 3 is an end elevation view of the apparatus shown in FIGS. 1 and 2;

FIG. 4 is an enlarged fragmentary sectional view taken on line 4—4 of FIG. 1;

DESCRIPTION OF THE PREFERRED EMBODIMENT

Figure 1:
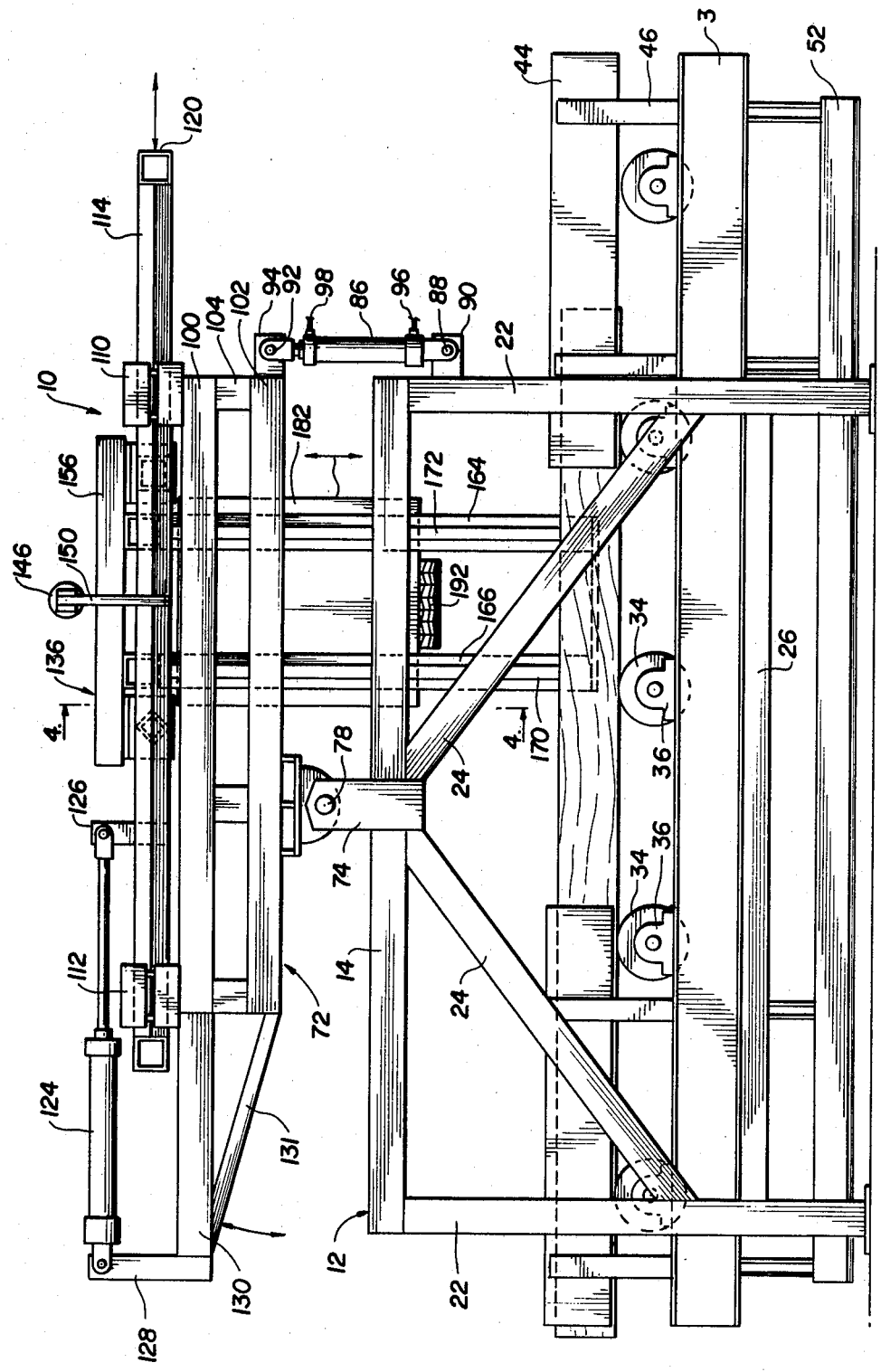
FIG. 1 is a side elevation view of tie dapping apparatus embodying the present invention.

Referring now to the drawings in detail, a tie dapping apparatus embodying the present invention is designated generally by the reference numeral 10 and includes a generally rectangular frame 12 made up of spaced, parallel side beams 14, 16 and end beams 18, 20, joined at their ends as by welding, and supported at each corner by vertical legs 22. As shown in FIGS. 1 and 3, suitable braces 24 are provided between the respective legs 22 and the side beams 14, 16, and between the legs and end beams 18, 20 to provide a rigid, strong open frame. Horizontally extending reinforcing beams 26 extend between and are rigidly joined to the legs 22 along each side and end of the frame in spaced relation to the bottom end of the legs.

A crosstie conveyor assembly 28 extends through the open frame 12, in parallel relation to the side beams 14, 16 and is supported on the reinforcing beams 26 which extend parallel to the end beams 18, 20. Conveyor 28 comprises a pair of elongated channel members 30, 32 supported in laterally spaced parallel relation to one another and having mounted thereon a plurality of driven conveying rollers 34 journaled for rotation about spaced parallel axes by suitable bearing blocks 36. Rollers 34 are driven by a suitable means such as motor 38 acting through chain 40 extending around a sprocket on the end of one of the rollers. Similar chains extend around pairs of sprockets on adjacent rollers so that all rollers are driven simultaneously to convey a timber or crosstie 42 longitudinally through the open frame. A rigid horizontal guide member 44 supported by suitable angle brackets 46 welded on and projecting upwardly from the channel 30 provides a fixed guide at one side of the conveyor for engaging one vertical face of a crosstie being conveyed through the apparatus. Suitable controls, not shown, are provided to control operation of the motor 38 to accurately position the crosstie longitudinally on the conveyor 28. A generally U-shaped channel guard 48 extends along the other side of the conveyor and overlies the roller drive chains 40 to protect them from falling debris.

When a crosstie 42 is stopped on the conveyor 28, the tie can be firmly clamped against the elongated edge guide 44 by a plurality of upwardly projecting clamping arms 50 each having their lower end rigidly mounted, as by welding, to an elongated support beam 52 extending beneath and parallel to the conveyor 28. Support beam 52 is mounted for limited pivotal movement about a horizontal axis beneath the reinforcing beams 26 by a pair of pivot shafts 54 extending through arms 50 and rigid brackets 56 projecting downwardly from the reinforcing bars 26. A second rigid bracket 58 is welded to and projects downwardly from one of the transversely extending reinforcing beams 26 at one end of the open frame, and a fluid ram 60 has its cylinder end pivoted, as by pin 62 to the bracket 58. The piston end of ram 62 is pivoted, as by pin 66 and suitable bracket means, not shown, to one of the upwardly projecting arms 50 to rotate the arms about the pivot shafts 54 through a limited distance. The upwardly projecting ends of the arms 50 extend above the conveyor rolls 34 and each rotatably support a roller member 68 in position to engage a crosstie to urge the crosstie into engagement with the edge guide 44. If desired, the roller members 68 may be formed from a resilient material to accommodate limited surface irregularities in the vertical face of the crosstie to be clamped. Thus, with fluid cylinder 60 actuated to retract its piston, the crosstie 42 will be firmly but releasably held against movement during contact by the rotary cutter head, described below, as the cutter head traverses the top surface of the tie to cut a dap of the desired depth.

A cutter head support platform assembly generally designated with the reference numeral 72 is pivotally mounted on top of the rectangular frame 12 by a pair of stub axles 74, 76 supported in coaxial relation one on each of a pair of upwardly extending support plate 78, 80, respectively rigidly welded to and projecting upwardly from the center portion of side beams 14, 16. A pair of journal bearings 82, 84, respectively, mounted on the bottom portion of support platform 72 mount the platform for pivotal movement about the horizontal axis of stub shafts 74, 76. A fluid actuated ram 86 has its cylinder end pivotally connected by pin 88 and rigid bracket 90 to the open rigid frame assembly 12 and its piston end pivotally connected by pin 92 and rigid bracket 94 to the pivotally mounted platform 72 so that application of fluid pressure through fluid connection 96 will project the piston and rotate the platform 72 counterclockwise as viewed in FIG. 1. Similarly, application of fluid pressure to inlet 98 will rotate the platform clockwise about the horizontal axis of the stub shafts 74, 76, which horizontal axis extends transversely of and is spaced vertically above the top surface of a crosstie 42 supported on the conveyor 28.

In plan view, the pivoted cutter head support platform 72 is an open rectangular frame the sides and ends of which are preferably made up of truss-like structures to provide high strength and dimensional stability without requiring excessive weight, the truss-like structures being most clearly illustrated in FIG. 1 wherein one side beam is illustrated as comprising top and bottom parallel bar members 100, 102 rigidly joined and held in spaced parallel relation by a plurality of web members 104. For clarity of illustration, however, such web members are omitted from the remaining figures of the drawings, it being understood that the specific structure configuration is not critical so long as the platform has the required strength and dimensional stability. The remaining side and the end members can all be of similar construction.

As best seen in the schematic illustration of FIG. 4, four gib blocks 106, 108, 110 and 112 are mounted on the top surface of the pivoted support platform 72, one adjacent each corner thereof, with blocks 106 and 108 being aligned to slidably receive and support a first rectangular tubular member 114 and gibs 110, 112 being arranged to slidably receive and support a second rectangular tubular member 116. Tubular members 114, 116 extend in parallel relation to one another and to the adjacent sides of support platform 72. Tubes 114, 116 are rigidly joined at their ends by structural members 118, 120 and cooperate therewith to form a rigid, rectangular carriage frame 122 which is movable as a unit through its gib block supports longitudinally of the support platform 72. This movement is accomplished by a fluid ram 124 connected between a bracket 126 rigidly welded on structural member 120 and a second bracket 128 on an elongated arm 130 having one end rigidly welded to support platform 72.

A pair of elongated carriage tracks 132, 134 extend in parallel spaced relation between and are rigidly welded to tubular members 114, 116 and a cutter carriage assembly 136 is slidably mounted, as by gib blocks 138, 140, 142 and 144, for movement along these tracks in a direction perpendicular to tubular members 114, 116.

Figure 2:
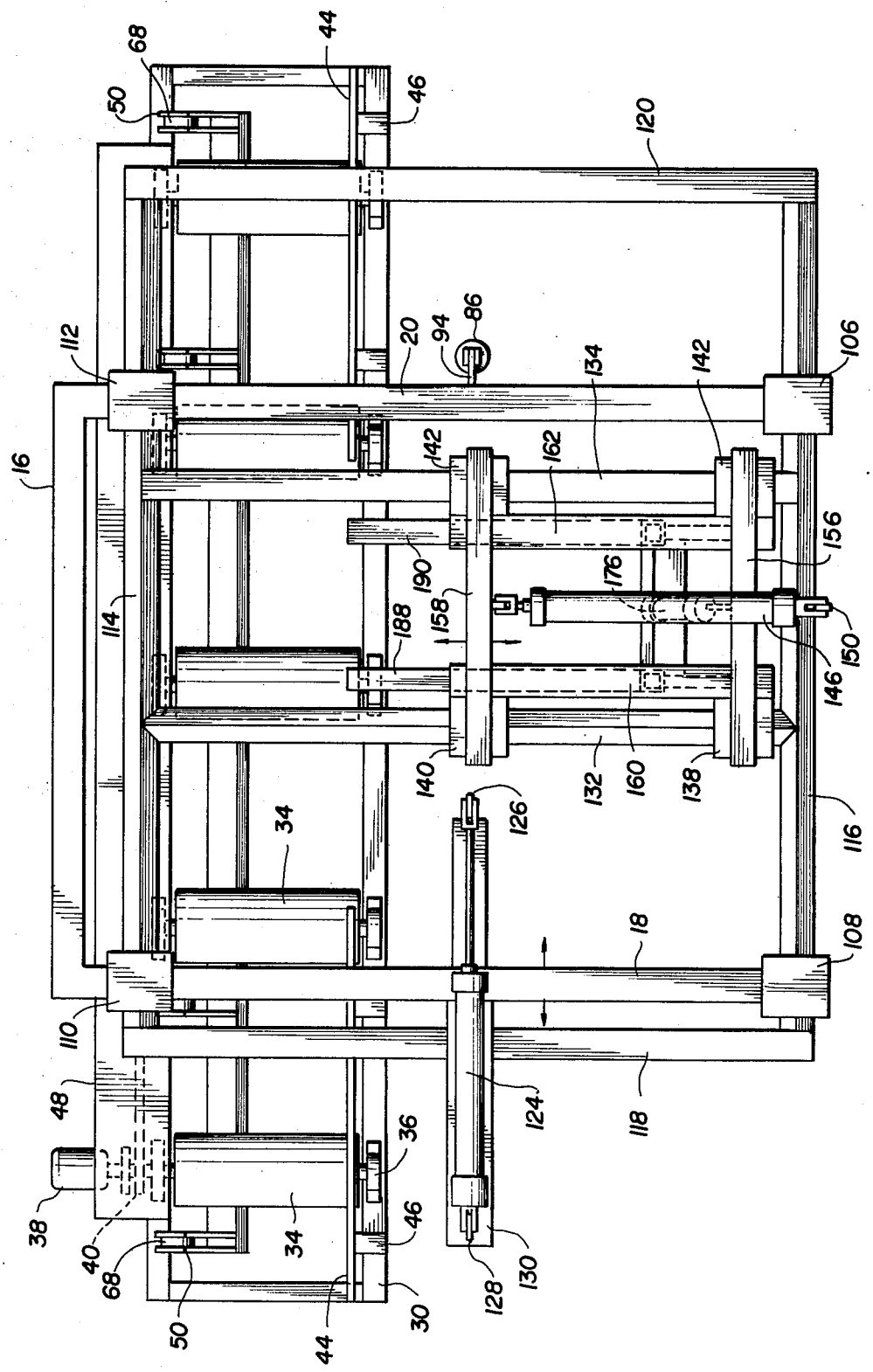
FIG. 2 is a top plan view of the apparatus shown in FIG. 1.
Figure 5:
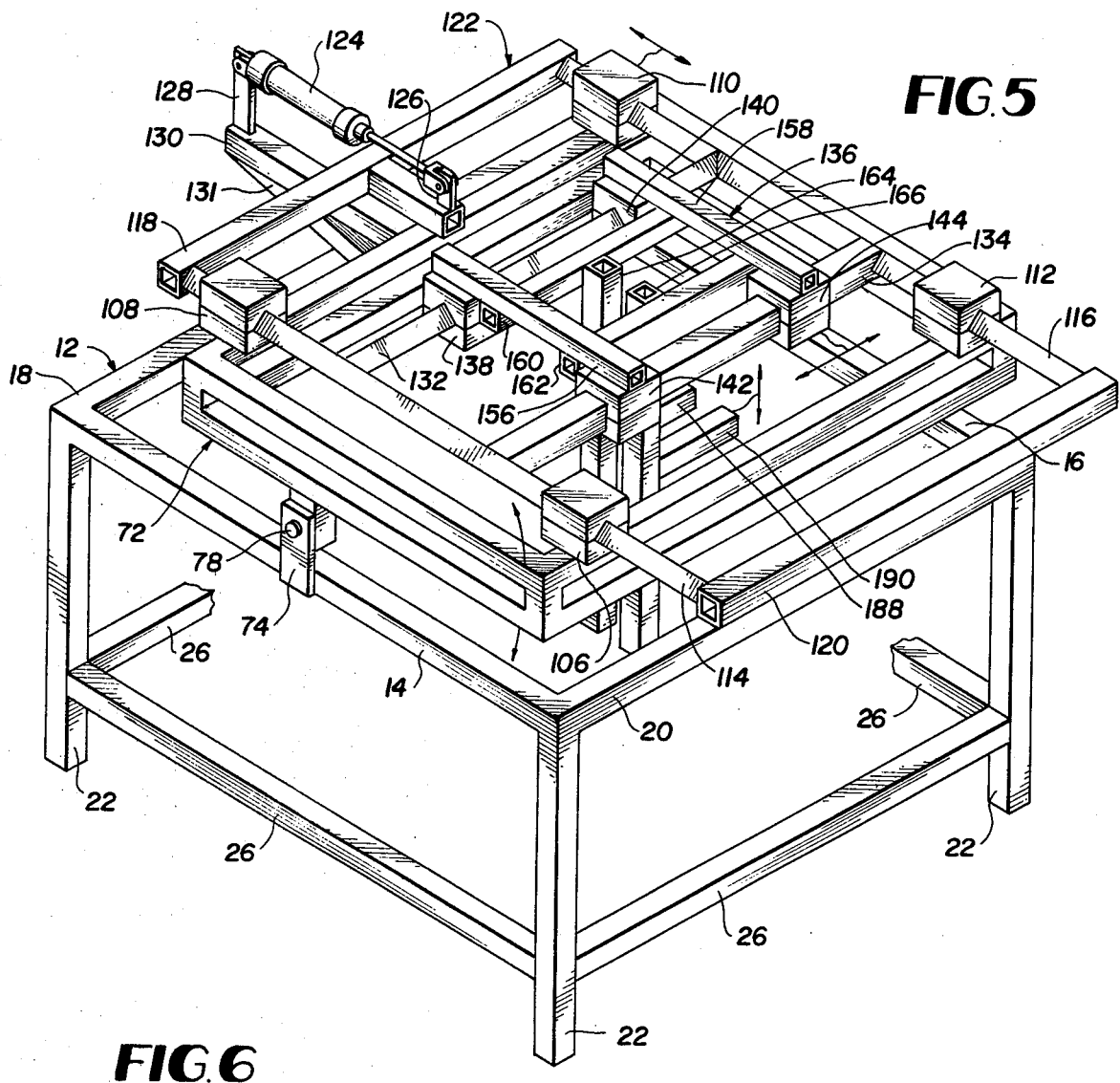
FIG. 5 is an isometric view of a portion of the apparatus shown in FIGS. 1-3 and illustrating the cutter head support and positioning mechanism.

As seen in FIGS. 1-3, carriage assembly 136 can be reciprocated along tracks 132, 134 by fluid actuated ram 146 having its cylinder end connected through pin 148 and bracket 150 to tubular member 116 and its piston end connected, through pin 152 and bracket 154 to a horizontal bar member 156 extending between and rigidly joined to gib blocks 140, 144. A second bar member 158 extends between and is rigidly joined to gib blocks 138, 142 for movement therewith and bar members 156, 158 are rigidly joined and retained in parallel spaced relation by a pair of structural members 160, 162 each having one end rigidly welded to each of the bar members 156, 158.

A pair of vertical support post 164, 166 are rigidly welded to and project downwardly one from the central portion of each of the structural members 160, 162 in spaced parallel relation to one another, and have their lower ends joined by a gusset plate 168. A pair of inclined brace members 170, 172 each has one end rigidly welded to gusset 168 and its other end rigidly joined, as by welding, to the bar member 158 to thereby reinforce the support posts 164, 166.

As most clearly seen in FIG. 4, a cutter head and motor support assembly 174 is slidably mounted on posts 164, 166 for vertical movement by fluid ram 176 having its cylinder end pivotally connected to bar 158 and its piston end pivotally connected, through pin 178 and bracket 180 to the support assembly. The support assembly 174 includes a vertically extending mounting plate 182 having a first pair of gib blocks 184, 186 rigidly mounted on one surface thereof and slidably engaging the vertically extending support post 166 and a second pair of similar gib blocks, not shown, slidably engaging support post 164. Rigidly welded to and projecting horizontally from the plate 182 are a pair of arms 188, 190 which support, adjacent their distal ends, a cutter head 192 journaled for rotation about a horizontal axis as by journal blocks 194. Rigidly joined on and projecting upwardly form arms 188, 190 is a drive motor platform 196 which supports on its top surface a suitable drive motor 198 for driving the cutter head 192. Platform 196 is also rigidly joined by suitable gussets to plate 182 to reinforce the arms 188, 190. Motor 198 drives cutter head 192 through a suitable drive means such as belt 200. Preferably, a removable shield 202 is mounted on the support assembly 174 and extends over the cutter head 192. Cutter head 192 may be a 10 inch diameter rotary cutter having a length of 10 inches whereby a 10 inch wide dap can be cut across a timber in a single pass. Such a cutter head is manufactured by Drake Corporation and is commercially available. A 20 horsepower three phase 60 cycle AC motor may be used to drive the cutter head.

To enable an operator to accurately determine the exact depth and angle, relative to the horizontal, of the bottom surface of a dap to be cut by the cutter head 192, a laser light 204 is mounted, as by bracket 206 on the cutter head and motor support assembly 174. The laser light is adapted to project a straight line of high intensity light and is mounted to project this line in a plane tangent to the bottom of cutter head 192 to strike the vertical face of a crosstie supported on the conveyor 128 in position to be dapped by the apparatus. The laser light line enables the machine operator to visually determine the exact position of the dap to be cut before moving the cutter head into contact with the tie. Such laser lights are also commercially available, one suitable light being the Carter Laser Guideline Light manufactured by Carter Products Company, Inc. of Grand Rapids, Mich.

Although not specifically illustrated in the drawings, suitable controls are provided for each of the driven components of the apparatus, including conveyor drive motor 38 and the cutter head drive motor 198 as well as the fluid rams 60, 86, 124, 146, and 176. Such controls may be conventional and preferably are arranged in an operator's console located at a control station adjacent the dapping apparatus in position to afford the operator a clear vision of the tie to be dapped.

In operation of the tie dapping apparatus described above, a crosstie 42 to be dapped is supplied, preferably from a suitable infeed conveyor not shown, onto the conveyor 28 and advanced longitudinally, i.e., endwise of the crosstie, until the position of the first dap to be cut is located in transverse alignment with the rotary cutter head 192. At this point, conveyor 28 is stopped and ram 60 is actuated to move arms 50 into position to firmly clamp the tie 42 against the guide 44. Preferably the location of the daps are premarked on the vertical face of the crosstie as by use of a suitable template, to enable the operator to clearly see when the crosstie is in the correct position. Alternatively, suitable retractable stops and/or position indicators may be provided on the conveyor to facilitate location of the crosstie.

Once the crosstie is located and clamped in position to be dapped, the operator actuates fluid ram 86 to rotate platform 72 to the desired angle, relative to the horizontal, required for the bottom surface of the dap to be cut. Ram 176 is then actuated to lower support assembly 174 to position the cutter head at the desired height to produce a dap of the desired depth. The loc-head longitudinally of the crosstie if necessary. Once the cutter head is properly located, ram 146 may then be actuated to project the carriage assembly 136 along carriage tracks 132, 134, causing the cutter to traverse and cut a flat bottomed dap in the top surface of the crosstie.

After the cutter head has completely traversed the crosstie, ram 146 is actuated in a direction to retract the carriage assembly. Thereafter, if it is desired that the dap be increased in width, it is only necessary to actuate ram 124 to shift carriage ram 122 the necessary distance, and then to actuate ram 146 to again cause the cutter head to traverse the top of the crosstie. Since the axis of rotation of cutter head 192 is parallel to the rectangular tubes of carriage frame 122, shifting the cutter head and motor support assembly along the carriage frame will move the cutter head along its axis of rotation so that the portion of the dap cut by the second pass will have its bottom surface lying in the same plane as the portion cut by the first pass regardless of the angle of the bottom surface of the dap relative to the longitudinal axis of the crosstie, as determined by the angular position of the platform 72 about its axis of rotation. Similarly, to cut a second dap in the crosstie, for example at a location adjacent the other end, it is only necessary to shift the crosstie to the desired location on the conveyor, and to then raise or lower the cutter head by actuation of the ram 176 to the extent necessary to cut the second dap to the desired depth, with the bottom surface of the second dap being in a plane parallel to the plane of the bottom surface of the first dap. Obviously, by cutting the second dap to the correct depth the bottom surface of the two daps may be made coplanar.

Figure 6:
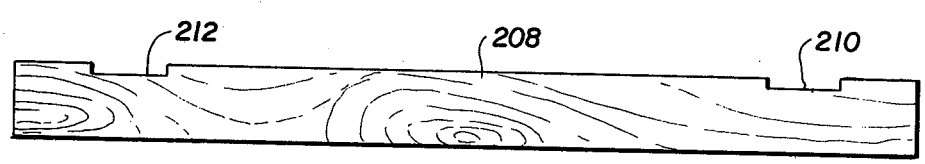
FIGS. 6-8 are elevation views of crossties having daps formed in their top surface using the apparatus shown in FIGS. 1-5.
Figure 7:
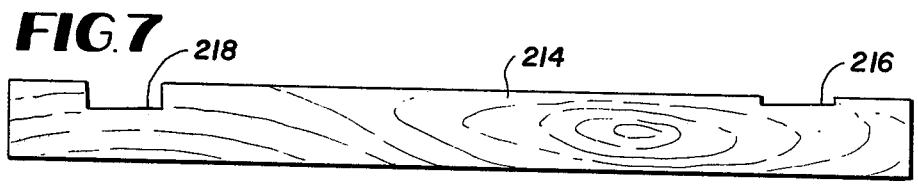
Figure 8:
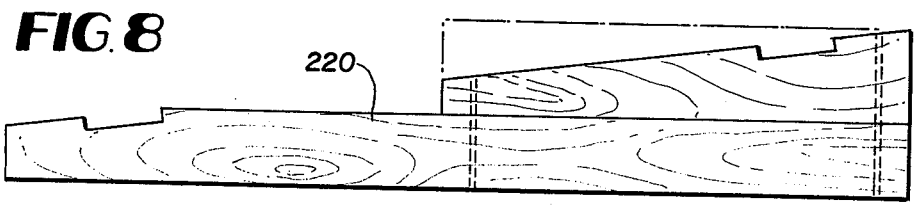

Referring to FIGS. 6–8, typical arrangements of daps cut one adjacent each end of a crosstie are illustrated. In FIG. 6, the crosstie 208 has a pair of daps 210, 212 cut in its top surface, with the bottom, flat surface of the two daps being coplanar and parallel to the bottom surface of the crosstie. To cut daps in this configuration, the carriage frame 122 is oriented in a plane parallel to the plane of the top surface of conveyor 28.

As shown in FIG. 7, a similar tie 214 may have daps 216, 218 cut one adjacent each end thereof with the bottom surface of the respective daps being inclined with respect to the longitudinal axis of the tie and being in a common plane. It is also believed apparent that daps similar to 216, 218 may be cut with the bottom surface being in parallel, spaced planes depending upon the positioning of the support assembly 174 along its support members when the two daps are cut.

FIG. 8 illustrates a crosstie 220 made up of two timber sections rigidly joined as by spikes to provide a substantially thicker tie, measured in a vertical direction, adjacent one end, with the daps 222, 224 cut adjacent the respective end of the tie lying in a common plane. Such a tie might be used to bank a railroad track in a relatively short radius curve wherein the common plane of the two daps is disposed at a relatively large angle with respect to the horizontal. In a tie dapping apparatus of the type described which has actually been constructed, the apparatus is capable of cutting a dap with the bottom surface disposed at an angle of 11° with respect to the horizontal, however, it should be apparent that this angle could be varied as necessary without materially altering the construction of the apparatus.

While the invention has been described with respect to a crosstie dapping apparatus wherein individual crossties are fed one at a time longitudinally through the open frame of the apparatus and wherein a single cutter head is employed to cut one or more daps in the crosstie, it is believed apparent that the apparatus could be modified so as to move the crossties transversely, i.e., in a direction perpendicular to their longitudinal axis through the apparatus. It is believed apparent that a plurality of cutter heads could be employed to cut a plurality of daps at spaced intervals along the length of the crosstie. For example, for standard railroad crossties wherein two daps are conventionally cut in each tie with the two daps being cut in fixed spaced relation to one another, two cutter heads could be mounted on a common carriage frame and actuated to simultaneously cut two daps in a tie which has been fed either longitudinally or transversely to a dapping station in the apparatus.

While the apparatus is particularly well adapted for cutting daps in timber, it is believed apparent that it may also be used for other purposes. For example, the cutter head may be employed to adz a smooth surface on a timber or to resurface the daps in older timbers. Also, the apparatus may be used to cut or mill a timber surface at a desired angle such as the inclined top surface of the crosstie 220 shown in FIG. 8.

It is also believed apparent that various modifications to the apparatus might be made without departing from the invention. Accordingly, while a preferred embodiment of the invention has been disclosed and described in detail, it is understood that the invention is not so limited and that it is intended to include all embodiments of the invention which would be apparent to one skilled in the art and which come within the spirit and scope of the invention.

What is claimed is:

1. A timber dapping apparatus comprising, in combination,
    a rigid frame,
    conveyor means for conveying a timber along a predetermined path past a dapping station,
    a rotary cutter head operable to cut a dap having a substantially flat bottom surface in a timber at said dapping station,
    mounting means supporting said cutter head on said frame at the dapping station,
    power means for driving said cutter head for rotation about an axis extending longitudinally of a timber at the dapping station,
    said mounting means including first selectively operable means for producing limited pivotal movement of the cutter head about a pivot axis extending in a first direction, the axis of rotation of said cutter head being spaced from said pivot axis and extending in a second direction perpendicular to said first direction and second selectively operable means for producing limited translational movement of the cutter head in a third direction parallel to the axis of rotation, and
    power means operable to produce relative movement between the cutter head and a timber at the dapping station to cause the cutter head to traverse and cut a dap in the timber.

2. The timber dapping apparatus according to claim 1 wherein said conveyor means further comprises timber clamping means selectively operable to releasably clamp a timber at the dapping station to retain the timber against movement during the dapping operation.

3. The timber dapping apparatus defined in claim 2 wherein said conveyor means comprises a driven roller conveyor operable to convey an elongated timber in a direction parallel to its longitudinal axis past said dapping station,
said conveyor means further comprising guide means extending along one side edge of said conveyor means.

4. The tie dapping apparatus defined in claim 3 wherein said mounting means comprises, platform means pivotally mounted on said frame for limited rotation about a fixed substantially horizontal pivot axis spaced above said axis of rotation and extending in a direction perpendicular to the direction of said axis of rotation, means supporting said cutter head on said platform means, and power means for pivotally moving said platform and said cutter head about said pivot axis.

5. The timber dapping apparatus defined in claim 4 further comprising laser light means mounted for movement with said cutter head, said laser light means being operable to project a line of high intensity light onto a timber at said dapping station to provide a visible indication of the depth of a dap to be cut and the angular orientation of the bottom surface of the dap relative to the horizontal for all positions of the cutter head.

6. The timber dapping apparatus according to claim 1 wherein said conveyor means further comprises timber clamping means selectively operable to releasably clamp a timber at the dapping station to retain the timber against movement during the dapping operation.

7. The timber dapping apparatus defined in claim 6 ng one side edge of said conveyor means.

8. The tie dapping apparatus defined in claim 1 wherein said mounting means comprises, platform means pivotally mounted on said frame for limited rotation about a fixed substantially horizontal pivot axis spaced above said axis of rotation and extending in a direction perpendicular to the direction of said axis of rotation, means supporting said cutter head on said platform means, and power means for pivotally moving said platform and said cutter head about said pivot axis.

9. The timber dapping apparatus defined in claim 1 wherein said first selectively operable means produces limited pivotal movement about a generally horizontal axis, and wherein said mounting means further comprises third cutter head positioning means selectively operable to produce limited movement of said cutter head in a generally vertical direction,
the cutter head being positioned to cut a dap in the upwardly directed surface of a timber at the dapping station and said third cutter head positioning means being operable to control the depth of the dap cut in the timber.

10. The tie dapping apparatus defined by claim 9 wherein said means for producing relative movement between the cutter head and a timber at the dapping station comprises means for moving said cutter head in a substantially horizontal direction across the top surface of the timber.

11. The tie dapping apparatus defined in claim 9 wherein said mounting means comprises platform means pivotally mounted on said frame for limited rotation about a fixed substantially horizontal pivot axis spaced above said axis of rotation and extending in a direction perpendicular to the direction of said axis of rotation, first track means supporting said cutter head on said platform means, and power means for pivotally moving said platform and said cutter head about said pivot axis.

12. The timber dapping apparatus defined in claim 11 wherein said mounting means further comprises support means mounting said cutter head for movement longitudinally of said first track means and power means for moving said cutter head along said first track means.

13. The timber dapping apparatus defined in claim 12 wherein said support means comprises second track means extending in a direction substantially perpendicular to said first track means, and carriage means being movable mounted on said second track means.

14. The timber dapping apparatus defined in claim 13 wherein said carriage means further comprises third track means extending in a direction substantially perpendicular to said first and second track means, guide means mounting said cutter head for movement on said third track means, and power means selectively operable to move said cutter head along said third track means.

15. The timber dapping apparatus defined in claim 14 further comprising laser light means mounted for movement with said cutter head, said laser light means being operable to project a line of high intensity light onto a timber at said dapping station to provide a visible indication of the depth of a dap to be cut and the angular orientation of the bottom surface of the dap relative to the horizontal.

16. The timber dapping apparatus according to claim 15 wherein said conveyor means further comprises timber clamping means selectively operable to releasably clamp a timber at the dapping station to retain the timber against movement during the dapping station.

17. The timber dapping apparatus defined in claim 16 wherein said conveyor means comprises a driven roller conveyor operable to convey an elongated timber in a direction parallel to its longitudinal axis past said dapping station,
said conveyor means further comprising guide means extending along one side edge of said conveyor means.

18. A method of dapping a timber comprising,
conveying the timber along a predetermined path extending past a dapping station,
stopping and releasably holding the timber at the dapping station,
providing a rotary cutter head operable to cut a dap having a substantially flat bottom surface in the timber at the dapping station
driving the cutter head for rotation about an axis extending longitudinally of the timber held at the dapping station,
supporting the cutter head for limited pivotal movement about a substantially horizontal pivot axis spaced from the axis of rotation and extending in a direction perpendicular to the direction of the axis of rotation,
pivotting the cutter head about the pivot axis to orient the axis of rotation of the cutter head relative to the longitudinal axis of the timber, and
producing relative movement between the cutter head and the timber at the dapping station to cause the cutter head to traverse and cut a first dap in the timber.

19. The method defined by claim 18 further comprising the step of supporting the cutter head for limited translation movement in a direction parallel to said axis of rotation, and wherein the step of producing relative movement between the cutter head and the timber includes moving the cutter head transversely of the timber in a first pass in the timber, moving the cutter head parallel its axis of rotation, and causing the cutter head to traverse the timber in a second pass whereby the bottom flat surface but in the first and second passes are substantially coplanar.

20. The method defined in claim 19 wherein the step of conveying the timber along a predetermined path comprises conveying the timber along a line parallel to its longitudinal axis.

21. The method defined in claim 20 further comprising the steps of releasing the timber after said first dap is cut, conveying the timer along said line for a predetermined distance, again stopping and holding the timber at the dapping station, and operating the cutter head to cut a second dap in the timber whereby the flat bottom of the first and second daps are parallel.

22. The method defined in claim 21 further comprising providing relative vertical movement between said predetermined path and said cutter head prior to causing the cutter head to traverse the timber to thereby vary the depth of the dap to be cut.

23. A timber dapping apparatus comprising, in combination, a rigid frame,
conveyor means for conveying a timber along a predetermined path past a dapping station,
a rotary cutter head operable to cut a dap having a substantially flat bottom surface in a timber at said dapping station,
mounting means supporting said cutter head on said frame at the dapping station,
power means for driving said cutter head for rotation about an axis extending longitudinally of a timber at the dapping station,
said mounting means including a first selectively operable means for producing limited pivotal movement of the cutter head about a pivot axis, said pivot axis being spaced from said axis of rotation and extending in a direction perpendicular to the direction of the axis of rotation, and second selectively operable means for producing limited movement of said cutter head in a direction perpendicular to said axis of rotation and perpendicular to the direction of said relative movement between said cutter head and a timber at the dapping station to thereby control the depth of the dap cut in the timber.

24. The tie dapping apparatus defined by claim 23 wherein said means for producing relative movement between the cutter head and a timber at the dapping station comprises means for moving said cutter head in a substantially horizontal direction across the top surface of the timber.

* * * * *